(12) United States Patent  
Nolan

(10) Patent No.: US 6,464,408 B1
(45) Date of Patent: Oct. 15, 2002

(54) FIBER OPTIC CONNECTORS

(75) Inventor: Richard G. Nolan, Endwell, NY (US)

(73) Assignee: Computer Crafts, Inc., Hawthorne, NJ (US)

( * ) Notice: Subject to any disclaimer, the term of this patent is extended or adjusted under 35 U.S.C. 154(b) by 0 days.

(21) Appl. No.: 09/473,372

(22) Filed: Dec. 28, 1999

Related U.S. Application Data

(60) Provisional application No. 60/114,382, filed on Dec. 28, 1998, and provisional application No. 60/134,669, filed on May 18, 1999.

(51) Int. Cl.[7] .............................................. G02B 6/36
(52) U.S. Cl. ............................. 385/87; 385/56; 385/70
(58) Field of Search ....................... 385/87, 86, 70–72, 385/76, 55, 56

(56) References Cited

U.S. PATENT DOCUMENTS

| | | | |
|---|---|---|---|
| 4,111,522 A | 9/1978 | Auracher et al. | 350/96.21 |
| 4,759,599 A | 7/1988 | Yamaguchi et al. | 350/96.21 |
| 4,818,059 A | 4/1989 | Kakii et al. | 350/96.21 |
| 4,830,456 A | 5/1989 | Kakii et al. | 350/96.2 |
| 4,950,048 A | 8/1990 | Kakii et al. | 350/96.2 |
| 4,978,193 A | 12/1990 | Tomita | 350/96.21 |
| 5,096,276 A | 3/1992 | Gerace et al. | 385/76 |
| 5,157,749 A | 10/1992 | Briggs et al. | 385/60 |
| 5,185,846 A | 2/1993 | Basavanhally et al. | 385/137 |
| 5,193,133 A | 3/1993 | Schofield et al. | |
| 5,214,730 A | 5/1993 | Nagasawa et al. | 385/59 |
| 5,230,032 A | 7/1993 | Muzslay | 385/66 |
| 5,253,316 A | 10/1993 | Shibutani et al. | |
| 5,259,050 A | 11/1993 | Yamakawa et al. | 385/59 |
| 5,274,729 A | * 12/1993 | King et al. | 385/134 |
| 5,337,385 A | 8/1994 | Baderschneider et al. | 385/59 |
| 5,339,376 A | 8/1994 | Kakii et al. | 385/71 |
| 5,363,460 A | 11/1994 | Marazzi | 385/70 |
| 5,390,267 A | 2/1995 | Yanagawa et al. | |

(List continued on next page.)

FOREIGN PATENT DOCUMENTS

| | | |
|---|---|---|
| EP | 0961144 A1 | 1/1999 |
| EP | 0973051 A1 | 1/2000 |
| WO | WO99/57593 | 11/1999 |
| WO | WO99/64917 | 12/1999 |

Primary Examiner—Ellen E. Kim
(74) Attorney, Agent, or Firm—Lerner, David, Littenberg, Krumholz & Mentlik, LLP

(57) ABSTRACT

A housing of a fiber optic connector such as an MT-RJ connector has a greater surface area and ridges for improved handling and grasping. A door is provided on a fiber optic connector socket to block light leakage from the socket. The door is compact and does not interfere with neighboring devices while closed. The connector has a housing that centers the ferrule and keeps it in a position for precise alignment with the opposing ferrule. A pin retainer is designed to allow insertion and removal of alignment pins in the field without the need for removing the connector from the fiber optic, so that male connectors can be connected to female connectors and vice-versa.

5 Claims, 10 Drawing Sheets

U.S. PATENT DOCUMENTS

| | | | |
|---|---|---|---|
| 5,404,416 A | 4/1995 | Iwano et al. ................... | 385/60 |
| 5,422,971 A | 6/1995 | Honjo et al. ................... | 385/80 |
| 5,481,634 A | 1/1996 | Anderson et al. .............. | 385/76 |
| 5,555,332 A | 9/1996 | Dean et al. .................... | 385/53 |
| 5,566,262 A | 10/1996 | Yamane et al. ................ | 385/33 |
| 5,611,010 A | 3/1997 | Shiino et al. ................... | 385/53 |
| 5,619,604 A | 4/1997 | Shiflett et al. ................. | 385/59 |
| 5,631,985 A | 5/1997 | Yamada et al. ................. | 385/59 |
| 5,638,474 A | 6/1997 | Lampert et al. ............... | 385/78 |
| 5,689,598 A | 11/1997 | Dean, Jr. et al. .............. | 385/59 |
| 5,712,939 A | 1/1998 | Shahid ........................ | 385/78 |
| 5,724,466 A | 3/1998 | Rickenbach et al. ........... | 385/60 |
| 5,727,102 A | 3/1998 | Jeong et al. ................... | 385/59 |
| 5,737,463 A | 4/1998 | Weiss et al. ................... | 385/59 |
| 5,764,834 A | 6/1998 | Hultermans ................... | 385/60 |
| 5,778,122 A | 7/1998 | Giebel et al. .................. | 385/55 |
| 5,778,125 A | 7/1998 | Busse et al. ................... | 385/80 |
| 5,799,122 A | 8/1998 | Jeong et al. ................... | 385/59 |
| 5,809,191 A | 9/1998 | Stevens et al. ................ | 385/59 |
| 5,809,192 A | 9/1998 | Manning et al. ............... | 385/78 |
| 5,815,621 A | 9/1998 | Sakai et al. ................... | 385/80 |
| 5,845,036 A | 12/1998 | De Marchi ................. | 385/139 |
| 5,862,281 A | 1/1999 | Shahid ........................ | 385/78 |
| 5,862,282 A | 1/1999 | Matsura et al. ................ | 385/86 |
| 5,867,621 A | 2/1999 | Luther et al. .................. | 385/59 |
| 5,883,995 A | 3/1999 | Lu .............................. | 385/60 |
| 5,887,098 A | 3/1999 | Ernst et al. .................... | 385/55 |
| 5,915,058 A * | 6/1999 | Clairardin et al. ............. | 385/55 |
| 5,926,596 A | 7/1999 | Edwards ...................... | 385/60 |
| 6,130,977 A | 10/2000 | Rosson | |
| 6,224,268 B1 | 5/2001 | Manning et al. | |
| 6,283,640 B1 * | 9/2001 | Stephenson et al. ........... | 385/55 |

* cited by examiner

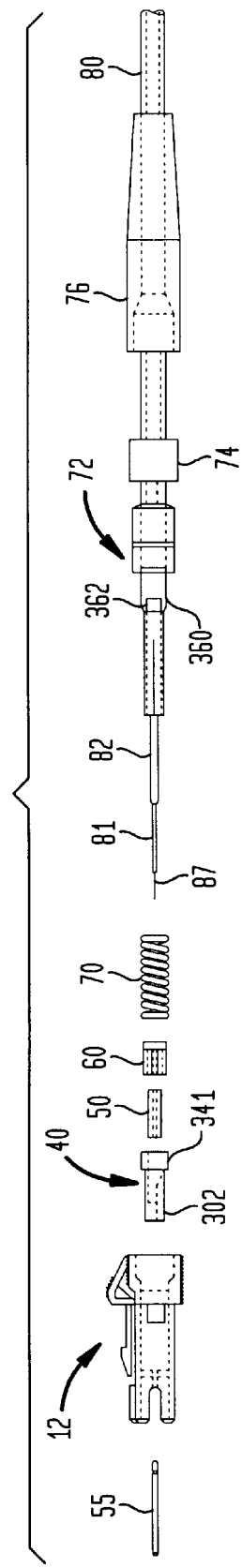
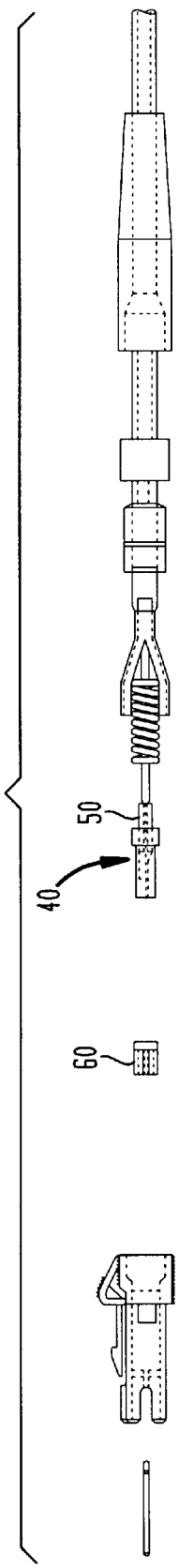
FIG. 21A
FIG. 21B

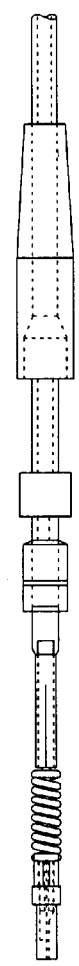
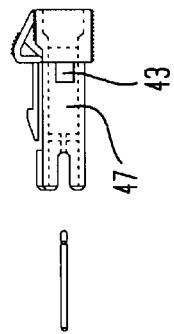
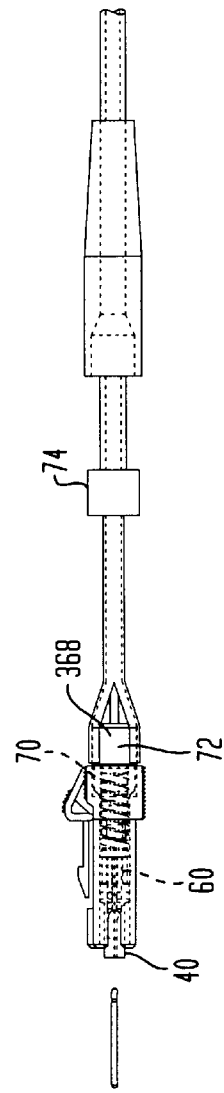
FIG. 21C
FIG. 21D

FIBER OPTIC CONNECTORS

CROSS REFERENCE TO RELATED APPLICATIONS

This application claims the benefit of U.S. Provisional Patent Application Ser. No. 60/114,382, filed on Dec. 28, 1998 entitled FIBER OPTIC CONNECTORS, and also claims the benefit of U.S. Provisional Patent Application Ser. No. 60/134,669, filed on May 18, 1999, entitled FIBER OPTIC CONNECTORS AND TRANSCEIVER TEST DEVICES. The disclosures of said provisional patent applications are incorporated by reference herein. The present application is also related to the copending, commonly assigned United States Patent Application of Richard G. Nolan entitled FIBER OPTIC CONNECTORS AND TRANSCEIVER DEVICES filed of even date herewith. The disclosure of which is hereby incorporated by reference herein.

FIELD OF INVENTION

The present invention relates to the field of fiber optics, and more specifically relates to improvements in connector components and methods for making those improved components.

BACKGROUND OF THE INVENTION

Fiber optic communication systems send messages in the form of pulses of light along thin strands of transparent material, referred to as fiber optics. One common application for such systems is in carrying digital data between computers in a network or between portions of a large computer. In a typical system, a device referred to as an optical transmitter includes a laser that emits light. The intensity of the light is varied in accordance with the information to be sent. The emitted light is focused on an end of an optical fiber so that the light is transmitted along the fiber. At the other end of the fiber, the light is directed onto a photodetector, which transforms the light into an electrical signal. The electrical signal also varies in accordance with the information being sent. A "duplex" system typically uses two fibers in parallel, and has a transmitter and a receiver at each end of the system so that information can be sent in opposite directions along the two fiber optics. The transmitter and receiver at each end typically are combined in a single device referred to as a "transceiver." Optical communication systems can transmit data at rates many times faster than systems using electrical wires, and offer other advantages.

Typically, the optical fibers are provided in optical cables. The fibers themselves are covered by protective coatings or "sheathing." The cable includes one or more individual sheathed fiber optics, covered by an external jacket and may also include components for protecting the cable against physical strain. To set up an optical communications system, cables of this type are connected to optical devices such as transceivers and to one another in much the same way as electrical cables are connected to electronic devices and to one another to set up an electronic system. However, connecting an optical cable requires that the individual optical fibers be precisely aligned with the mating fibers or devices. The optical fibers commonly are as small as 0.125-mm (0.005 inches) in diameter. To connect two fibers end-to-end, the mating ends should be aligned with one another within a few microns, i.e., within hundred-thousandths of an inch, and should be butted against one another with essentially no gaps. Even slight deviation from these tolerances can cause appreciable loss of light transmitted along the fibers and degradation of the signal. Likewise, when an optical cable is connected to a transceiver or other device, the fibers must be precisely positioned relative to the optical elements of the device. Optical cables are provided with devices referred to as "connectors" which can be engaged with mating connectors on other cables, or with mating features on transceivers or other devices, to align the fibers with the required precision.

One known type of fiber optic connector is a so-called "MT" type. The MT connector has a connector housing with a front end and a ferrule movably mounted in the housing. The ferrule is biased by a spring to a forward position. When the ferrule is in the forward position, a front face of the ferrule projects from the housing. A multi-fiber cable extends into the housing. The individual fibers of the cable extend through the ferrule to the front face. The front face of the ferrule, and the ends of the fibers, are polished to form a flat surface. The fiber ends are precisely located within the ferrule. The ferrule also has pin-receiving bores. A male MT-type connector has pins in these bores projecting beyond the front face, whereas a female MT connector has the bores empty. Two cables may be connected to one another by engaging male and female MT connectors with one another so that the pins of the male connector enter the pin receiving bores of the female connector. The ferrules are free to "float" or move slightly relative to the housing of the connectors and hence are brought into precise alignment with one another by the pins. Also, because each ferrules is free to move rearwardly relative to its housing against the spring bias, the ferrules can be brought into abutting, face to face contact despite tolerances in the housings. These connectors can provide the good connection between the individual fibers of the two cables, with low optical transmission losses.

One type of connector that has been proposed is referred to in the industry as an MT-RJ connector. U.S. Pat. No. 5,926,596 depicts a typical MT-RJ connector. Reference is made to the '596 patent without admission as to whether or not such patent constitutes prior art against the present invention. As shown in the '596 patent, a typical MT-RJ connector includes an exterior housing which resembles the exterior housing of the common "RJ" plug used to connect a home telephone to a wall outlet. The housing has a flexible catch on its exterior. A "ferrule" is movably mounted within the housing at a forward end of the housing, so that a forward face of the ferrule is exposed to the exterior of the housing. A spring inside the housing urges the ferrule in the forward direction. The ferrule has a pair of fiber bores for receiving two individual fibers of the cable, and a pair of pin holes for receiving alignment pins. A "male" MT-RJ connector has alignment pins permanently disposed in its alignment pin holes, whereas a "female" MT-RJ connector has empty pin holes. The connectors may be permanently installed on the ends of fiber optic cables by the cable manufacturer. The cable manufacturer positions the fibers in the fiber bores and polishes the ends of the fiber precisely flush with the front of the ferrule.

To connect two cables end-to-end, male and female connectors are inserted into opposite ends of a hollow double-ended socket so that the catches on their housing engage with the socket and the socket physically holds the housings in crude alignment with one another. The pins on the ferrule of the male connector engage the pin holes in the ferrule of the female connector, and hold the ferrules, and hence the fibers, in precise alignment with one another. The springs in the housings urge the ferrules forwardly so that the front faces of the ferrules, and hence the ends of the fibers, abut one another. Devices such as transceivers are equipped with single-ended sockets adapted to receive the housing of a connector. Such sockets are equipped with pins corresponding to the pins of a male MT-RJ connector for engaging the ferrule of a female connector so as to hold the ferrule and hence the fibers of the cable in precise alignment with the device.

Despite considerable effort devoted by the art to development of fiber optic connectors, sockets and related components, there are still needs for further improvements.

There exists a need for further improvement to the housing of an MT-RJ connector that would allow easier insertion and removal of the connector. Currently, the housing of MT-RJ connectors are quite small and do not provide adequate surface area for a technician to grasp the connector. However, any extension of the surface area of the housing or variation in shape must conform to industry standards for these connectors. A connector that is too large may interfere with neighboring connectors or sockets by limiting access to those connectors, as in a network hub or other computer systems employing fiber optics.

There is also a need to improve the latch mechanism to prevent accidental releases of the connector from the socket.

Regarding the socket, a need exists to provide a socket design that allows a technician to visually determine, or by touch, the orientation of the socket to ensure that the connector is rotated to the correct position to have proper alignment of the fiber optics. In a typical MT-RJ connector, there is only one orientation for both the connector and the socket that will properly position the fiber optics. As such, a keyway is provided in the socket with an accompanying protrusion on the connector that matches the keyway. Thus, the connector can only be inserted into the socket in only one way. However, the sockets are quite small and are usually positioned inside a computer or in a space that is crowded with other fiber optic couplers, thus making it difficult for a technician to find the proper alignment of the connector and socket. A visual aid on the outside of the socket would allow a technician to identify the correct orientation of the socket without difficulty.

There also exists a need to improve sockets to prevent the contamination of the optical interface by dust or other particulate matter entering the socket when an end of the socket is open and unoccupied by a cable. Such particulate matter can cause difficulties in making a connection. Also, there exists a need to improve the socket to block light emission from such an unoccupied socket end. If a device is connected to one end of a socket and the other end of the socket is left open, light emitted by the device is sent out into the room environment. The emitted light can cause unpleasant sensations if it impinges on the naked eye. Some occupational and environmental health authorities regard such emitted light as potentially dangerous. Accordingly, it would be desirable if a socket could be provided with some device to block such emissions when the socket is unoccupied. However, any such device should be economical to manufacture and should not interfere with installation of a connector in the socket. Moreover, sockets of this type must fit within limited space set by industry standards. Any emission-blocking device should not make the socket appreciably larger, and should allow the socket to meet industry standards. Taken together, these requirements pose a considerable challenge.

A further need persists to improve the ferrule assembly in the connector. The ferrules of mating connectors must be properly aligned and centered to ensure a proper connection without undue transmission losses. Proper alignment also prevents stubbing of the guide pins when the connectors are mated. Stubbing occurs when one of the ferrules of two mated connectors are off center and the guide pins of the male connector are not inserted into the holes of the female connector. When stubbing occurs, the ferrules are pushed back into the housing of the connector, resulting in a misalignment of the fiber optics and thus no light passing through the coupler.

It would be desirable to provide a connector with the flexibility to allow a field technician to adjust the guide pin placement, depending on field requirements. In some cases, a transceiver or other connector may have a pin placement that does not correspond to the connector to be mated. When this occurs, it would be desirable to adjust the pins of a connector without having to remove and replace the connector from the fiber optic with a new pin configuration. This would save a tremendous amount of time and labor and reduce the down time of the network system. Such a connector should also be reusable after a pin adjustment.

SUMMARY OF THE INVENTION

The present invention addresses these needs and provides improvements that can be used in MT-RJ connectors and in similar connectors. The improved connector is described below.

In accordance with one aspect of the invention, a fiber optic connector comprises a housing adapted to hold a fiber optic cable. The housing has a forward direction, upward and downward directions transverse to the forward direction and lateral directions transverse to the forward direction and transverse to the upward and downward directions. The housing includes a main portion having a downwardly-facing bottom surface and the housing further includes a forward portion projecting forwardly from the main portion. The connector is used in an assembly with a generally tubular socket having forward and rearward directions, upward and downward directions transverse to the forward and rearward directions of the socket and lateral directions transverse to the other directions of the socket. The socket defines a bore extending in the forward and rearward directions. The socket also has a downwardly-facing bottom surface. The bore of the socket is adapted to receive the forward portion of the housing in a predetermined orientation relative to the socket so that the directions of the housing are aligned with the corresponding directions of the socket. A latch for holding the housing and the socket together, and a latch release member disposed above the main portion of the housing are also provided. The latch is adapted to release the housing from the socket when the latch release member is depressed toward the main portion of the housing. The bottom surface of the main portion projects downward to or below the bottom surface of the socket when the forward position of the housing is received in the bore. Thus, the bottom surface of the housing main portion is not recessed relative to the bottom surface of the socket. This allows the technician to grasp the housing easily.

Preferably, the bottom surface of the socket and the bottom surface of the main portion of the housing are generally planar. More preferably, the bottom surfaces of both the socket and the housing main portion are substantially coplanar when the forward portion of the housing is received in the bore of the socket.

It is also preferred that the bottom surface of the housing main portion has a pattern of projections and recesses thereon. More preferably, these projections and recesses are in the form of laterally-extending ridges and grooves. The socket and main portion of the housing desirably each have laterally-facing, generally planar side surfaces. The side surfaces of the housing and socket desirably are substantially coplanar with one another when the forward portion of the housing is engaged in the bore. This further facilitates the technician grasping the connector to insert or remove it from the socket. The housing desirably also has ridges and grooves to aid in grasping. The housing for the connector, however, desirably does not extend past the perimeter of the socket, when viewed front to rear. The increase in surface area does not interfere with the ability of the technician to handle neighboring connectors or other devices in proximity to the connector.

The latch release member desirably is resilient and formed integrally with the main portion of the housing. The latch includes an arm projecting forwardly from the latch release member over the forward position of the housing, and a barb projecting upwardly from the arm remote from the latch release member. The socket also has a recess for engaging the barb.

According to another aspect of the present invention, a fiber optic connector assembly comprises a housing adapted to hold a fiber optic cable. The housing has a forward direction, upward and downward directions transverse to the forward direction and lateral directions transverse to the forward direction and transverse to the upward and downward directions as described above. The housing includes a main portion and a forward portion projecting forwardly from the main portion also described above. The housing further includes a resilient latch release member projecting upwardly and forwardly from the main portion of the housing and a latch arm formed integrally with the latch release member and projecting forwardly from the release member above the forward portion. A barb with a rearwardly-facing catch surface projects upwardly from the arm at a forward end of the arm remote from the latch release member. The fiber optic connector further comprises a socket having forward and rearward directions, upward and downward directions transverse to the forward direction of the socket and lateral directions transverse to other directions of the socket. The socket defines a rear face and a bore extending forwardly from the rear face. The socket has a top wall with an interior surface facing downwardly towards the bore. The top wall has a pocket open to the interior surface and an axially-facing catch surface extending to the interior surface. The bore of the socket is adapted to receive the forward portion of the housing and the arm in a predetermined orientation relative to the socket so that directions of the housing are aligned with the corresponding directions of the socket and so that the arm faces toward the top wall and the barb is received in the pocket with the catch surface of the barb confronting the catch surface of the top wall. The top wall defines a ramp surface sloping downwardly in the forward direction of the socket. The ramp surface overlies the arm when the housing is engaged with the socket and rear portions of the ramp surface remote from the engaged catch surfaces are spaced upwardly from the arm. Spacing of the rear portion of the ramp surface from the arm helps to prevent inadvertent release of the catch responsive to vertical forces applied to the connector housing in service. This aspect of the invention incorporates the realization that inadvertent releases of the latch can be caused by engagement between the rear portion of the arm and the socket if the housing is forced upwardly during service. Providing a clearance alleviates this problem.

Preferably, the latch release member includes a beam having a first portion projecting upwardly and forwardly from the main portion of the housing and having a second portion projecting downwardly from the main portion. The beam is preferably flexible at least at the junction between the first and second portions. The beam is desirably formed integrally with the housing, is less than about 1-mm thick and is unreinforced at least at the junction between the first and second portions.

According to a further aspect of the present invention, a socket for receiving a fiber optic connector housing is provided. The socket has forward and rearward directions, upward and downward directions transverse to the forward and rearward directions and lateral directions transverse to the other the directions. The socket defines a bore extending in the forward and rearward directions. The bore has a principal portion and a keyway extending along the top of the principal portion. The keyway has lateral dimensions less than the lateral dimensions of the bore. The socket has an exterior profile including a principal portion having a first width and a top portion having a second width less than the first width. The top portion and the principal portion cooperatively defines a pair of ledges extending axially on opposite sides of the top portion. The principal portion of the bore is disposed in the principal portion of the exterior shape. The keyway extends in the top portion. This aspect of the current invention incorporates the realization that technicians had difficulty in determining the orientation of the keyway of the socket. The ledges provide visual and tactile reference, to the top of the keyway, thus indicating the proper orientation for the connector to be inserted into the socket.

Another aspect of the invention provides a socket for receiving a fiber optic connector housing. The socket has forward and rearward directions, upward and downward directions transverse to the forward and rearward directions and lateral directions transverse to the other said directions. The socket defines a bore having an opening at the rearward end of the housing and extending forwardly into the housing. The housing has a panel mounting portion spaced forwardly from the rear end of the housing. A door and one or more hinges supporting the door on the housing are also provided for pivoting movement about a vertical axis between a closed position in which the door blocks the opening of the bore and an open position in which the door does not block the opening. A spring is also disposed outside of the housing. The door, the hinges and the spring have width and height dimensions equal to or smaller than the width and height dimensions of the panel mounting portion.

Preferably, the housing defines a first indentation at the rearward end of the housing and the hinges include a top hinge disposed in the first indentation. The housing defines a bottom surface at the rearward end of the housing. The bottom surface desirably is recessed upwardly relative to the bottom surface of the panel engaging portion, and the hinges include a bottom hinge overlying the recessed bottom surface. Preferably, the recessed bottom surface extends laterally across the exterior of the housing and the door defines a bottom overhang which projects downwardly beyond the recessed bottom surface. The first indentation may be disposed on one lateral side of the housing and the housing desirably defines a second indentation on the opposite lateral side. The door has an overhang portion which is aligned with the second indentation. As discussed above, the housing may defines a main bore and a keyway having width smaller than said main bore. The keyway may be disposed between the first and second indentations.

The overhanging portions of the door allow the technician to engage the door readily with a finger or tool and to swing the door out of the way during installation of a connector in the socket. To further facilitate this action, it is also preferable that the door has a projection extending rearwardly on a side of the door remote from the hinges, so that the technician can engage the projection to open the door.

The housing desirably has at least two resilient panel extensions projecting outwardly from the housing in vertical directions, lateral directions or both vertical and lateral directions beyond the dimensions of the panel mounting portion. The panel extensions are disposed rearwardly of the panel mounting portion. The panel extensions are inwardly deformable so that the housing can be advanced into a panel and the panel extensions will deform inwardly to pass through an opening in a panel and return outwardly to hold the socket in the panel. The socket may further include engagement projections projecting outwardly from the housing in vertical directions, lateral directions or both vertical and lateral directions beyond the dimensions of the panel mounting portion. The engagement projections are spaced forwardly of the panel extensions so that a panel can be engaged between the engagement projections and the panel extensions. The panel extensions work with the engagement projections to allow the socket housing to be inserted into a hole in a panel and have the housing be secured in the hole. Desirably, each panel extension includes a portion of a lateral wall of the housing. Each such lateral wall has a U-shaped slot bordering such portion of the wall so that each such wall portion forms a tongue connected to the remainder of the wall only at the at the rearward end of the tongue.

In yet another aspect of the present invention, a fiber optic connector includes a housing having forward and rearward directions. The housing has an interior passage extending forwardly and rearwardly. A pair of stops is also provided projecting into the passageway. The stops are spaced apart from one another in a first direction transverse to the forward and rearward directions. The housing has interior guide surfaces bounding the passageway to the rear of the stop surfaces and sloping outwardly away from one another in the rearward direction. A ferrule is further provided having a front end and a rearward portion. At least one fiber bore for holding an optical fiber extending into the ferrule from the front end, and at least one pin-receiving bore parallel to the fiber bore extending into the ferrule from the front end are provided. The rearward portion of the ferrule has a dimension in the first direction greater than the dimension of the opening between the stops. The ferrule is slidably disposed in the housing with the rearward portion disposed to the rear of the stops. The ferrule is movable between a forward position in which the ferrule is engaged with the stops and a rearward position in which the ferrule is disengaged from the stops. Guide surfaces constraining the ferrule in at least one direction transverse to the forward and rearward directions when the ferrule is in the forward position are also provided. The constraint is released due to the slope of the guide surfaces as the ferrule moves rearwardly in the housing. Also provided is a spring biasing the ferrule forwardly against the stops. This aspect of the invention provides a unit that tends to keep the ferrule centered in the connector housing before the connectors are mated, thus facilitating proper alignment when connectors are mated. Stubbing of the guide pins is thus minimized. However, the ferrule can float or move laterally with respect to the housing during mating.

Preferably, the guide surfaces constrain the ferrule in all directions transverse to the forward and rearward directions when the ferrule is in the forward position. More preferably, the housing has upward and downward directions transverse to the axial direction and lateral directions transverse to the axial direction and transverse to said upward and downward directions. The passageway desirably is generally rectangular in cross-section and has vertical walls facing laterally inwardly toward one another and horizontal walls facing upwardly and downwardly toward one another. The guide surfaces desirably include a first pair of guide surfaces extending along the vertical walls and a second pair of guide surfaces extending along the horizontal walls. The ferrule desirably has a forward portion defining the front end of the ferrule and projecting between the stops. More preferably, the stops define rearwardly-facing seating plane surfaces. The ferrule further has forwardly-facing shoulder surfaces engaged with the seating plane surfaces when the ferrule is in the forward position. Desirably, the second pair of guide surfaces include a pair of straight wall regions extending rearwardly from the seating plane surfaces and a pair of sloping wall regions extending from said straight wall regions.

The ferrule may be a molded element having a parting line. The parting line extends forwardly and rearwardly in the body. The body has slots extending forwardly and rearwardly and are aligned with the parting line, whereby the slots provide clearance for the parting line. This aspect of the invention incorporates the realization that in the molding process used to form the ferrule, irregularities may be formed along the parting line. The slots allow a clearance around the parting line to accommodate any such irregularities. This further reduces the possibility of misalignment of the fiber optics or stubbing of the guide pins.

In another aspect of the present invention, a method of providing matable fiber optic connectors preferably comprises the following steps: providing a plurality of terminated fiber optic cable ends, each such cable end having thereon a housing and a ferrule unit resiliently mounted in the housing. Each such ferrule unit has an exposed forward face and the optical fibers of the cable extend to exposed ends at such forward face. Each such ferrule unit further having one or more pin-receiving bores extending rearwardly from such forward face in predetermined locations relative to the exposed ends of the fibers. Each such pin-receiving bore desirably includes a clearance portion adjacent the forward face of the ferrule unit and an interference-fit portion having at least one dimension smaller than the interference-fit portion remote from the forward face. Another step includes selectively making some of the cable ends into male ends or hermaphroditic ends by engaging pins in at least some of the pin-receiving bores of the ferrule units on such ends so that such pins are forcibly engaged in the interference-fit portions of the pin-receiving bores and such pins project beyond the forward face of the ferrule unit. The pin-engaging step is performed while the housings and ferrule units remain in place on the cable ends.

Preferably, the step of making at least some of the cable ends into male ends or hermaphroditic ends includes the step of making such ends male ends by inserting pins into all of the pin-receiving bores of those ends. Desirably, each pin has a groove at a proximal end. The proximal ends of the pins are engaged in the interference-fit portions of the pin-receiving bores. A related aspect of the present invention provides a method of providing matable fiber optic connectors comprising the steps of providing a plurality of terminated fiber optic cable ends. Each such cable end has thereon a housing and a ferrule unit resiliently mounted in the housing. Each such ferrule unit has an exposed forward face and has optical fibers of the cable extending to exposed ends at such forward face. Each such ferrule unit further has one or more pin-receiving bores extending rearwardly from such forward face in predetermined locations relative to the exposed ends of the fibers. Each such pin-receiving bore includes a clearance portion adjacent to the forward face of the ferrule unit and an interference-fit portion having at least one dimension smaller than the interference-fit portion remote from the forward face. At least some of the cable ends are male or hermaphroditic cable ends having pins forcibly engaged in the interference-fit portions of at least some of the pin-receiving bores and projecting beyond the forward faces of the ferrule units. The method further includes converting at least some or the male or hermaphroditic ends to female ends by extracting the pins from the ferrule units of such ends while the housings and ferrule units remain in place on the cable ends.

Methods according to these aspects of the invention provide for field insertion or field removal of the pins and hence allow the technician in the field to mate up any cable end to any device or mating end, without regard to whether the cable ends are originally male or female.

Another aspect of the present invention discloses a terminated fiber optic cable end comprising a fiber optic cable including one or more fibers, a housing mounted on an end of the cable, and a ferrule unit resiliently mounted in the housing. Each such ferrule unit has an exposed forward face and has optical fibers of the cable extending to exposed ends at such forward face. Each such ferrule unit further has one or more pin-receiving bores extending rearwardly from such forward face in predetermined locations relative to the exposed ends of the fibers. Each such pin-receiving bore includes a clearance portion adjacent to the forward face of the ferrule unit and an interference-fit portion has at least one dimension smaller than the interference-fit portion remote from the forward face.

Preferably, the terminated fiber optic cable ends further comprise pins in the pin-receiving bores of the ferrule unit. Each of the pins has a proximal end engaged in the interference-fit portion of one of the pin-receiving bore. Each pin has a distal end projecting through the clearance portion of the pin-receiving bore beyond the forward face of the ferrule unit. More preferably, the proximal end of each pin includes a tapered proximal tip, a groove encircling the pin, and a cylindrical portion between the tapered proximal tip and the groove. Each pin also includes a cylindrical main region extending from the groove toward the distal end of the pin. Preferably, the ferrule unit includes a ferrule defining one or more fiber bores holding said fibers. The ferrule also defines the clearance portions of one or more pin-receiving bores. The ferrule unit also includes a pin retainer formed separately from the ferrule and defining interference fit portions of one or more pin-receiving bores. Alternatively, the pin retainer may comprise blind holes into which the pins are inserted.

Desirably, the pin-retainer has a slot extending to each interference-fit portion so that the interference-fit portion of each pin-receiving bore can expand to accommodate insertion and removal of pins. The ferrule unit desirably includes two pin-receiving bores and two fiber bores, the pin-receiving bores and fiber bores being disposed in a common plane. The pin retainer desirably has a central opening in the common plane, where the fibers pass through the central opening. Preferably, the pin retainer has an entry slot extending transverse to the common plane. The ferrule has a rear face and a central opening extending into the ferrule from the rear face in the common plane. The ferrule also has a front wall defining a front face of the ferrule unit. The fiber bores of the ferrule extend through the front wall to the central opening of the ferrule. The cable end desirably further comprises a hollow tubular ferrule plug having front and rear ends and a central passageway extending between such ends. The front end of the ferrule plug is disposed in the central opening of the ferrule. The rear end of the ferrule plug is disposed in the central opening of the pin retainer. The ferrule plug maintains the pin retainer in alignment with the ferrule. Also preferably, the cable is a ribbon cable that includes a pair of buffered fibers side-by-side. The ribbon cable extends into the central passageway of the ferrule plug. The cable includes a pair of fibers each having an outer buffer and an inner buffer. The outer buffers of the fibers terminate just to the rear of the ferrule plug, with portions of the fibers covered by the inner buffers extending into the central passageway. The outer buffers of the fibers have diameters larger than the height of the central passageway in the ferrule plug, whereby upon rearward movement of the ferrule, the ferrule plug will bear on the outer buffers of the fibers to minimize flexing of fibers.

The cable end may further comprise a spring engaged between the housing and the pin retainer biasing the pin retainer forward relative to the housing to thereby maintain the pin retainer in engagement with the ferrule and bias the entire ferrule unit forwardly relative to the housing. Desirably, the pin retainer has a rear surface and a recess in the rear surface. The spring may be a coil spring encircling the fibers of the cable and engaged in the recess.

In a related aspect of the present invention, a method of making a terminated fiber optic cable end comprises the following steps. Assembling a ferrule having a rear surface, a central passageway open to the rear surface, a front wall, one or more fiber bores extending through the front wall to the central opening and pin-receiving bores extending from the front wall to the rear surface, with a ferrule plug having a central passageway so that the ferrule plug is received in the central opening and the ferrule plug projects rearwardly from the rear surface of the ferrule. Assembling one or more optical fibers of a cable with the ferrule so that each such fiber extends through the passageway of the ferrule plug and through one of the fiber bores in the ferrule, and fastening the fibers to the ferrule. Assembling a pin retainer with the plug and ferrule to form a ferrule unit. The rearwardly-projecting portion of the ferrule plug engaging in a central opening of the pin retainer. The ferrule plug holds the pin retainer in alignment with the ferrule so that pin-receiving bores in the pin retainer are aligned with pin-receiving bores in the ferrule.

Preferably, the method further comprises the step of placing the pin retainer on the fibers remote from the ferrule and plug so that the fibers extend through the central opening of the pin retainer. The step of assembling the pin retainer to the ferrule and plug includes the step of sliding the pin retainer forwardly along the fibers to the ferrule and plug. More preferably, the step of placing the pin retainer on the fibers includes the step of passing portions of the fibers remote from the ends of the fibers through an entry slot in the pin retainer into the central opening of the pin retainer. Desirably, the method further comprises the step of assembling a housing and a spring to the ferrule unit. The method described above allows a technician to insert and withdraw the guide pins without having to remove or replace the entire connector.

BRIEF DESCRIPTION OF THE DRAWINGS

FIGS. 21A–21F are assembly diagrams showing successive stages of an assembly process according to one embodiment of the present invention, with certain parts depicted as transparent for clarity of illustration.

DETAILED DESCRIPTION OF THE PREFERRED EMBODIMENTS

Figure 1:
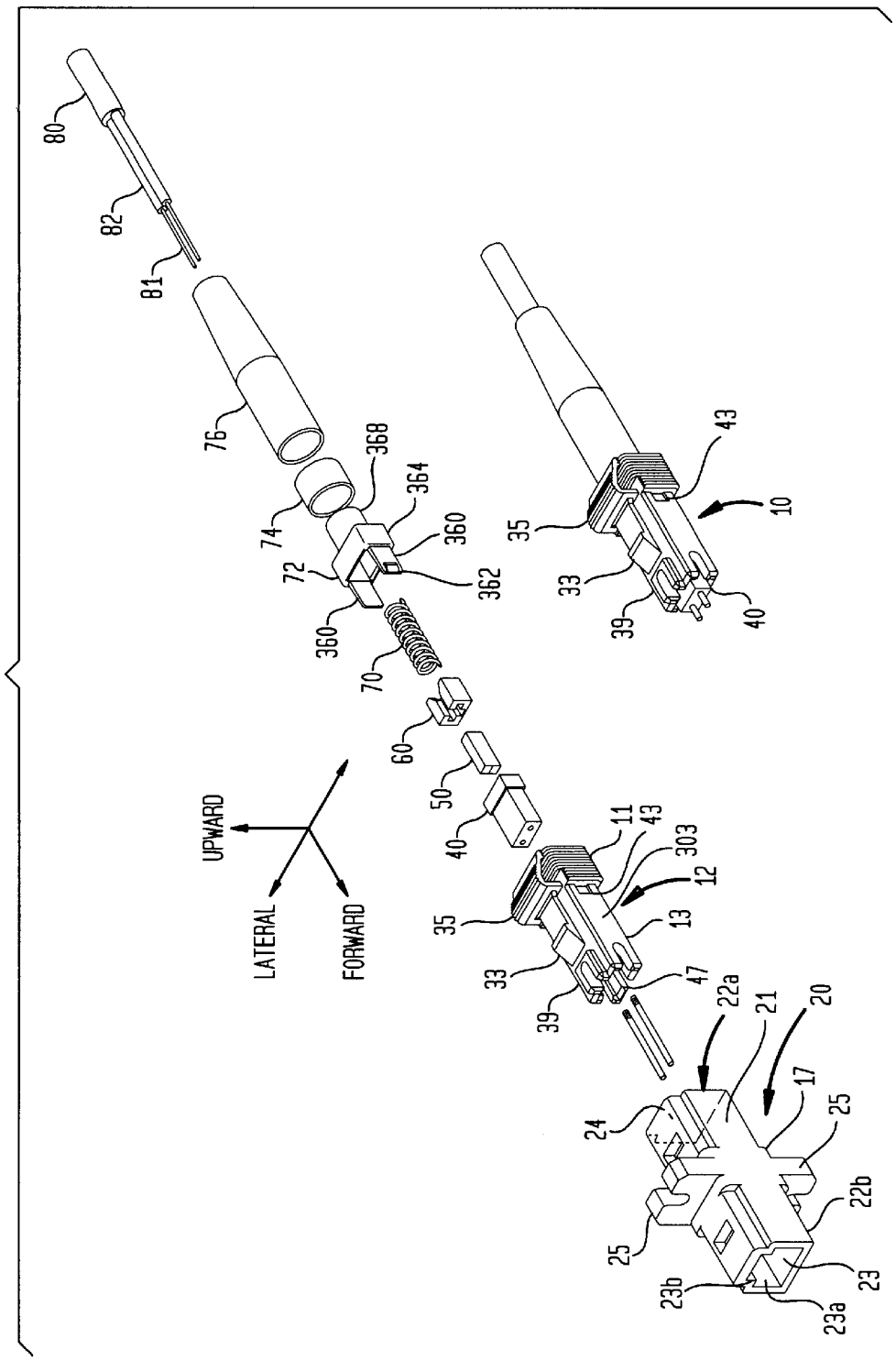
FIG. 1 is an exploded view of a connector and coupler according to one embodiment of the present invention.

Referring to FIG. 1, a fiber optic connector 10 along with a coupler 20 are shown. The coupler 20, as best seen in FIGS. 2–5 has two hollow sockets 22a and 22b with interior bores 23 and 24 in these sockets communicating with one another. Certain features of the socket, coupler and connector are explained below with reference to directions such as "upwardly", "forwardly", "rearwardly" and "laterally". These directions are orthogonal to one and other as illustrated in FIG. 1. As shown in FIG. 1, the "forward" direction is the direction in which the connector 10 is advanced when the connector is inserted into the socket 22. These directions are given in the frame of reference of the socket, coupler and connector itself, and need not bear any relation to the gravitational frame of reference. Merely by way of example, the coupler depicted in FIG. 1 could be rotated 90° about its forward-to-rearward axis, so that the upward and downward directions of the coupler would lie in the horizontal direction of the drawing.

The coupler 20 is formed from a polymer such as polycarbonate and has a panel-engaging center part 17 and two flat mounting lugs 25 extending from the center part 17 in the upward and downward directions. Mounting lugs 25 have mounting slots 26 at their upper and lower ends. The mounting lugs 25 and the mounting slots 26 are used to secure the coupler 20 to a panel or other body. A screw (not shown) can be set into each mounting slot 26 so that the lug 25 lies between the head of the screw and the surface where the coupler is to be attached.

Bore 23 has a generally rectangular main portion 23a with a smaller rectangular keyway portion 23b along the top of the main portion. This keyway only allows one way for the connector 10 to be inserted, as explained below. Bore 24 has an identical configuration.

This keyway design is also reflected on the exterior of the coupler 20, as best seen in FIGS. 2–5. Thus, the exterior profile of socket 22a includes a principal portion 21a housing the main portion 23a of the bore, and a top portion 21b housing keyway portion 23b. Top portion 21b is narrower than principal portion 21a, so that the exterior of the housing provides indentations in the form of elongated ledges 27 extending forwardly and rearwardly along the top of socket 22a. These ledges provide a visual and tactile reference indicating the orientation of the keyway. These ledges 27 reflect the contours of the keyway; the keyway portion 23b is disposed between the ledges or indentations 27. The same arrangement is provided on socket 22b. The ledges 27 aid the technician to quickly and easily identify the correct orientation for the connector 10 to be inserted into the socket. The bottom surface 8 of each socket 22a and 22b is recessed upwardly from the bottom of the panel engaging portion 17.

Each socket 22 also has a latch pocket 28 extending from the top of the socket and intersecting the keyway portion of its bore 23 or 24. The features associated with each latch pocket 28 are identical to the corresponding features of the socket illustrated in FIG. 11, described below.

Figure 11:
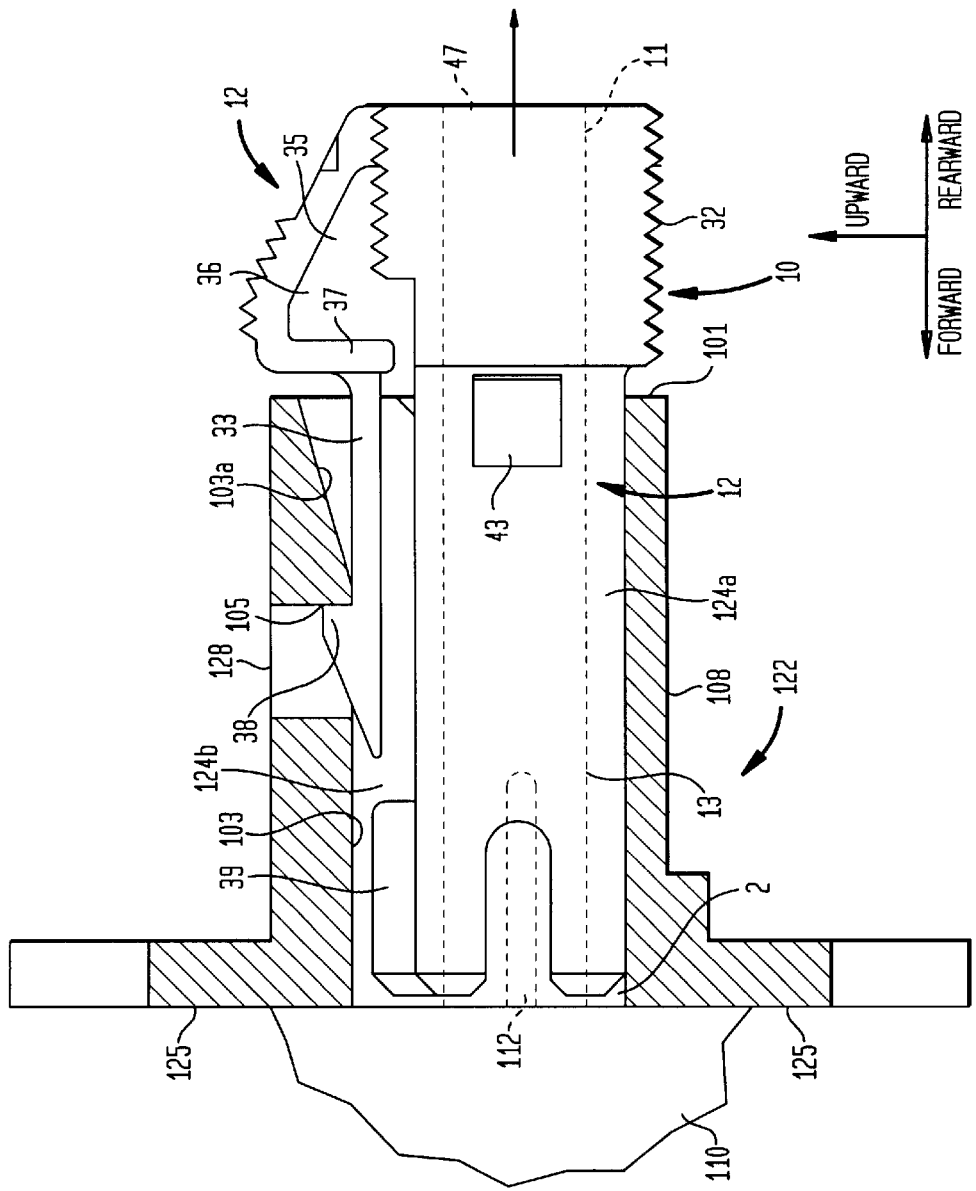
FIG. 11 is a diagrammatic side cross-sectional view of a housing engaged with the socket according to one embodiment of the invention.

As shown in FIG. 11, a single-sided socket includes a body 122 defining a rear face 101 and a bore 124 extending in a forward direction (to the left as seen in FIG. 11) from rear face 101. The socket incorporates mounting lugs 125 with openings 126 for receiving screws (not shown) or other fasteners for holding the socket in place. When the socket is used with a device such as a transceiver 110, the active optical components of the transceiver 110 are mounted in precise relationship to the interior bore of the housing so that they will be aligned with the fiber optics of the mating connector. The transceiver typically will have pins 112 projecting rearwardly into bore 124 for engagement with a female ferrule on the mating coupler.

Bore 124 has a configuration identical to bores 23 and 24 discussed above with reference to FIGS. 1–5. Thus, bore 124 includes a main portion 124a and a keyway portion 124b at the top of the main portion, the keyway portion defining a top interior surface 103 of the bore. The latch pocket 128 extends downwardly through the top wall of the socket so that pocket 128 is open to the top interior surface 103 of the bore. The latch pocket has a forwardly-facing catch surface 105 intersecting the top interior surface of the bore. The top interior surface 103 of the bore includes a ramp surface 103a sloping downwardly in the forward direction and extending from the rear face 101 to the vicinity of latch pocket 128 and catch surface 105.

A connector 10 according to a further embodiment of the invention comprises a housing 12 that has a main portion 11 and a forward portion 13 extending from the main portion. The interior of the connector 12 further comprises a ferrule 40, a ferrule plug 50, a pin retainer 60, a spring 70, a crimp nut 72, a crimp ring 74, and a boot 76. As shown in FIG. 1, the connector is used with an optical cable including an outer jacket 80 covering a pair of sheathed fibers 82.

The connector housing 12, best seen in FIG. 11, is formed from a polymer such as polycarbonate housing 12 and has a latch arm 33 that is attached to the connector housing by a flexible, beam-like latch release member having an upwardly sloping portion 35 extending forwardly from the rear of the housing main portion 11, and having a downward projection 37 extending to the junction with the latch release arm. A barb 38 is located at the distal end of the latch arm 33, remote from projection 37.

Figure 2:
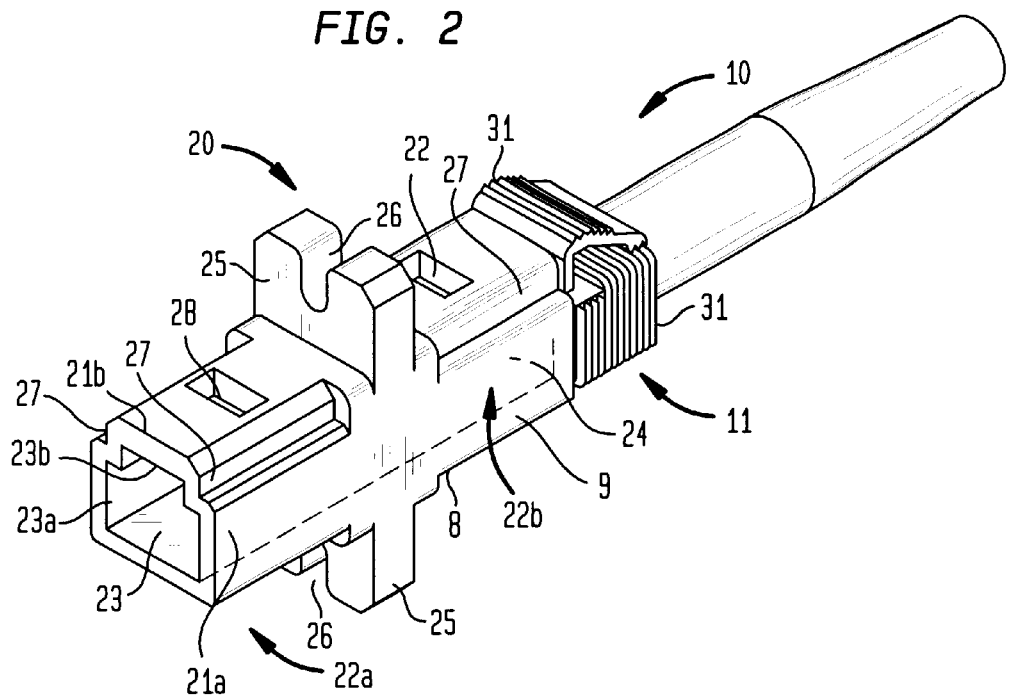
FIG. 2 is a top plan view of the housing engaged in the socket according to one embodiment of the present invention.

As best seen in FIGS. 2 and 11, the forward portion 13 of connector housing 12 is received into the bore 24 or 124 of the socket, leaving the main portion 11 exposed. The main portion 11 has an increased exposed surface area for grasping the connector 10 during withdrawal from the socket. Grip like features 31, in the form of ridges and grooves, on all four sides of the connector housing main portion 11, particularly on top and bottom, enhance the holding and grasping of the connector during insertion and withdrawal.

The connector housing 12 also has a key portion 39 located on the top of the forward portion 13 on the housing. The key portion 39 is a rectangular projection from the top of the forward portion that determines the proper orientation for engagement of the connector into the socket. The forward portion and key portion give the connector housing a profile that corresponds to the outline of the socket bore. When the connector housing 12 and coupler 20 are engaged, only the forward portion 13 is received in the bore of the socket. The proper orientation is established as the key portion 39 on the forward portion of the housing is engaged in the keyway 24b (FIG. 4) or 124b (FIG. 11) of the socket bore. The barb 38 located on the latch arm 33 engages with the latch pocket 28 or 128 on the socket, thus securing the connector housing 12 to the socket 20. A rearwardly-facing surface on barb 38 engages with the forwardly-facing catch surface 105 (FIG. 11) on the housing.

There is a clearance or spacing between arm 33 and ramp surface 103a at and near the rear face 101 of the socket. This clearance prevents engagement between the open end of the socket and the proximal portion of the latch arm 33, remote from barb 38, if the connector housing 12 is displaced upwardly relative to the socket during service. If the clearance were not present, such engagement could cause the latch arm to bend downwardly and could cause accidental disengagement of barb 38 from the latch pocket.

The geometry of the latch release member decreases the stiffness at the junction of the upwardly sloping portion 35 and the downward projection 37. In particular, the stiffness in region 36 at the juncture of these portions should be limited. Surprisingly, it has been found that reducing the stiffness of the latch release member, particularly at region 36, actually reduces the tendency of the latch arm 33 to deflect downwardly in response to rearwardly-directed forces on body 12. This in turn minimizes the tendency of latch arm 33 to bend away and disengage the barb. Desirably, the latch release member, including portions 35 and 37, is less about 1 mm thick or less and hence is relatively flexible.

The size or profile of the main portion 11 of the connector housing is matched to the size of the socket 22 or 122. The bottom surface 32 of the connector housing is substantially coplanar with the bottom surface 8 or 108 (FIGS. 4 and 11) of the socket. Alternatively, the bottom surface of the connector housing may project slightly below the bottom surface of the socket 20.

Figure 3:
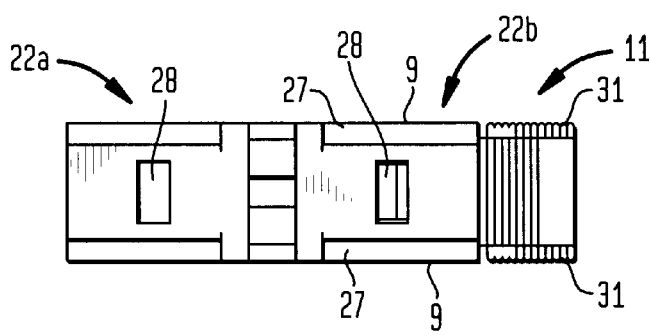
FIG. 3 is top view of the socket and housing of FIG. 2.
Figure 4:
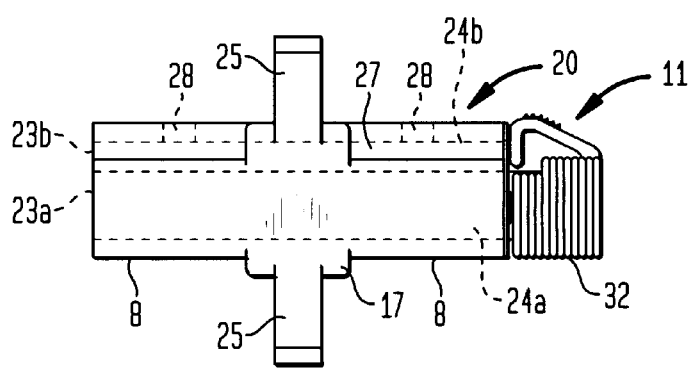
FIG. 4 is a side plan view of the socket and housing of FIG. 2.
Figure 5:
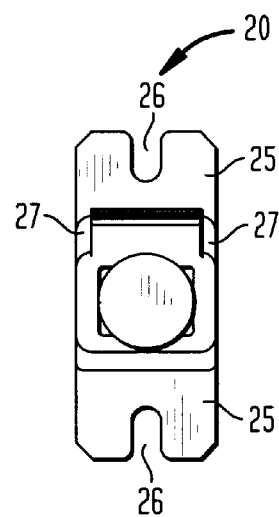
FIG. 5 is a front plan view of the socket and housing of FIG. 2.
Figure 6:
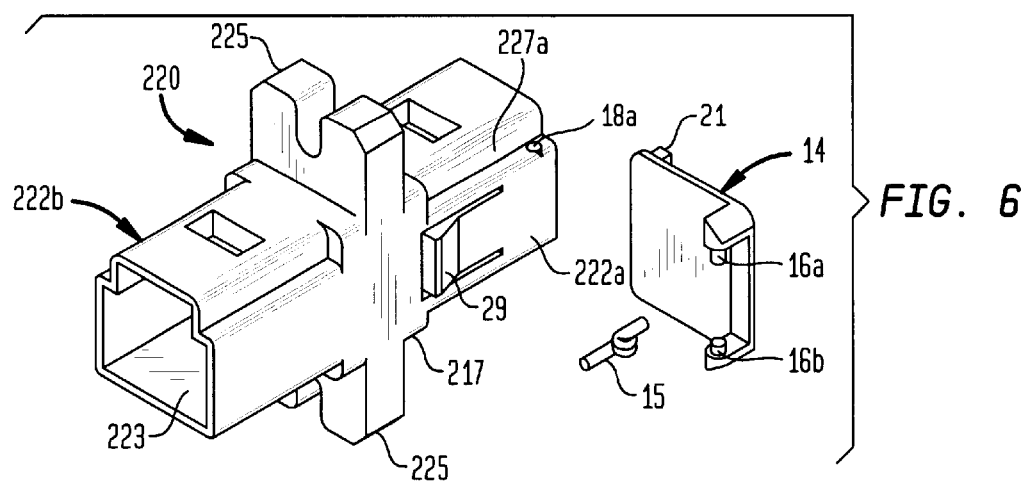
FIG. 6 is a diagrammatic perspective view of a coupler according to one embodiment of the present invention.
Figure 7:
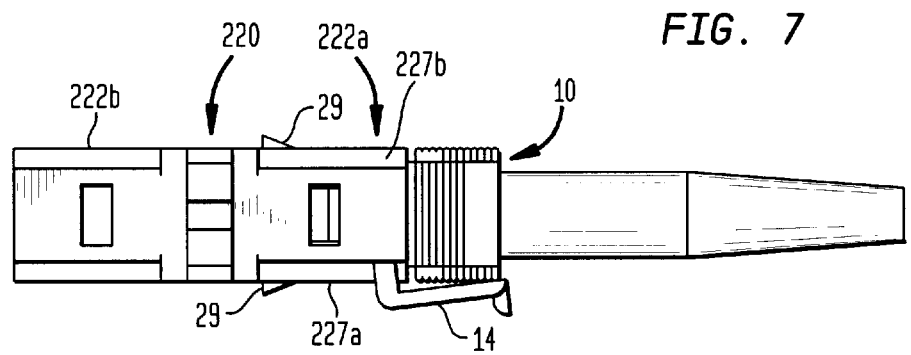
FIG 7 is a top plan view of the coupler in FIG. 6 where the coupler is engaging the housing of the MT-RJ connector.
Figure 8:
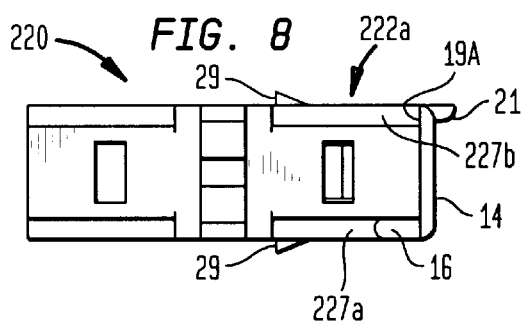
FIG. 8 is a top plan view of the coupler of FIG. 6 where the door is closed.

Also, the lateral surfaces 31 of the connector housing main portion 11 are coplanar with the lateral surfaces 9 of the principal portion of the socket (FIGS. 2 and 3). Alternatively, surfaces 31 may protrude slightly in the lateral direction beyond the surfaces 9 of the socket. The coplanar or protruding bottom and lateral surfaces of the connector main portion make it easy for the technician to grasp the main portion 11 during insertion or removal of the connector in the socket. The socket does not block the technician's fingers from engaging the connector housing. Moreover, the substantially coplanar surfaces provide a "streamlined" appearance to the completed assembly.

The coupler 220 illustrated in FIGS. 6–10 is similar to the coupler as described in FIGS. 1–5 in that it has two hollow sockets 222a and 222b back to back, with the interior bores 223 and 224 (FIG. 9) of these sockets communicating with one another. A door 14 is incorporated into the socket 222a at one end of the coupler 220 for the purpose of keeping particulates from entering the optical interface, and for the purpose of blocking light emission from an optical system. Thus, if an active device such as an optical transceiver is connected to coupler 220 disposed in the bore 223 without door 14, and no connector 10 is connected in the bore 224 equipped with door 14, the door will block light emitted by the transceiver from passing out into the environment.

The door has an upper hinge 16a with a pin projecting downwardly and a lower hinge 16b with a pin projecting upwardly in alignment with the upper hinge pin. A spring 15 includes a short, two-turn metal wire coil with a pair of arms projecting from the coil. The hinges 16 and spring 15 are designed in such a way that when assembled to the socket 222 and in closed position, the door with hinge and spring do not extend beyond the maximum width (w) and height (h) (FIG. 10) of an industry-standard MT-RJ socket. An industry-standard RJ type socket has a height (h) of 10±0.1-mm and a width (w) of 9.3±0.1-mm, and the socket according to this aspect of the invention, including the door 14, desirably has the same width and height. Therefore, the socket 222a according to this aspect of the invention will fit into a panel opening of the size normally used to hold an MT-RJ socket, i.e. typically about 10.1-mm high and 9.4-mm wide or larger.

The socket 222a has a panel-engaging portion 217 remote from the open end of the socket having the maximum width and height. As explained in greater detail above with reference to FIGS. 1–5, the housing of the socket 222a has reduced dimensions in the top portion around the internal keyway portion of the bore so that the socket defines exterior indentations in the form of ledges 227a (FIGS. 6 and 7) and 227b (FIG. 9) in the top of the socket 222a. The top hinge 16a of the door 14 and the spring 15 are accommodated in indentation 227a. The bottom external surface 201 (FIG. 9) of the socket 222a near the rear face of the socket (to the right in FIG. 9) is recessed upwardly relative to the bottom surface of the panel-engaging portion 217. The bottom hinge 16b is accommodated in this recess. The pin of top hinge 16a is arranged to fit into an upwardly-facing depression 18a on the upwardly facing surface of ledge 227a. The coil of spring 15 surrounds the pin of upper hinge 16a. The pin of lower hinge 16b fits into a similar depression 18b (FIG. 9) in bottom surface 201.

Figure 10:
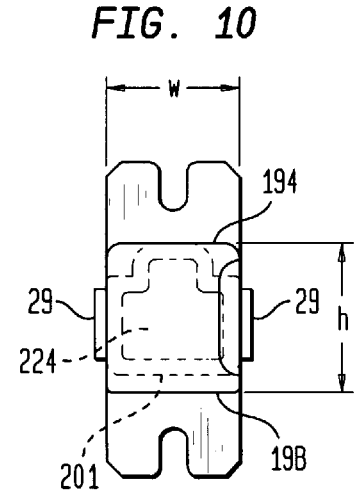
FIG. 10 is a front elevational view of the coupler of FIG. 6.

The door 14 is designed with two overhang features 19A and 19B, and one forward extension 21, allowing the door to be grabbed and manipulated from three separate directions or locations when the door is closed. Thus, one overhang feature 19A of the door lies in front of ledge 227*b* (FIG. 8) on the top of the socket and on the side of the socket remote from hinges 16. The other overhang 19B projects downwardly beyond the recessed bottom surface 201 (FIG. 10). Extension 21 projects forwardly on the edge of the door 14 remote from hinges 16. These features provide easy opening of the door. The door, hinges and spring all fit within the vertical and lateral dimensions of panel-engaging portion 217.

Figure 9:
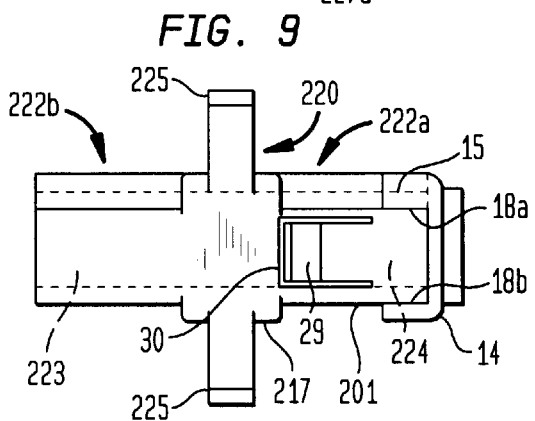
FIG. 9 is a side elevational view of the coupler of FIG. 6.

The socket has mounting lugs 225 similar to the mounting lugs projecting upwardly and downwardly from panel-engaging portion 217. Two panel stops 29 are molded in socket 222*a*. Each panel stop 29 is formed as a tongue portion of a lateral wall, each such tongue portion being separated from the remainder of the wall by a U-shaped slot 30, as best shown in FIG. 9 so that the tongue is attached to the remainder of the wall at the rear end of the tongue. The socket, and hence the entire coupler, can be mounted in a panel opening corresponding to the panel-engaging portion 217. The rear or door end of socket 222*a* is inserted through the panel opening. Because the entire door assembly is has lateral and vertical dimensions no larger than those of panel-engaging portion 217, the door passes through the cutout in the panel. The panel stops 29 depress, allowing the socket 222*a* to be inserted into the panel opening, and then extend to secure the socket in the panel opening without benefit of screws or other holding devices. Once the socket has been inserted in the panel opening, the panel is caught between panel stops 29 and mounting lugs 225. However, screws or other fasteners can be engaged in the mounting slots 26.

Figure 14:
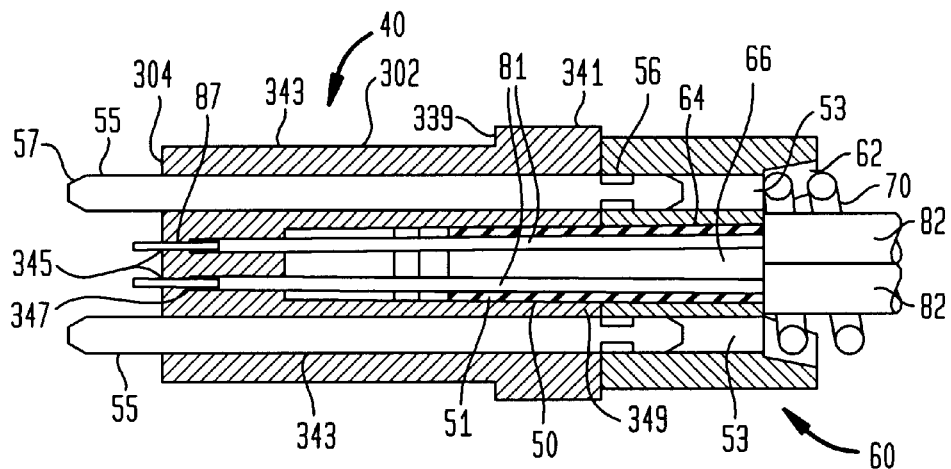
FIG. 14 is a top cross-sectional view of the ferrule according to one embodiment of the invention.
Figure 15:
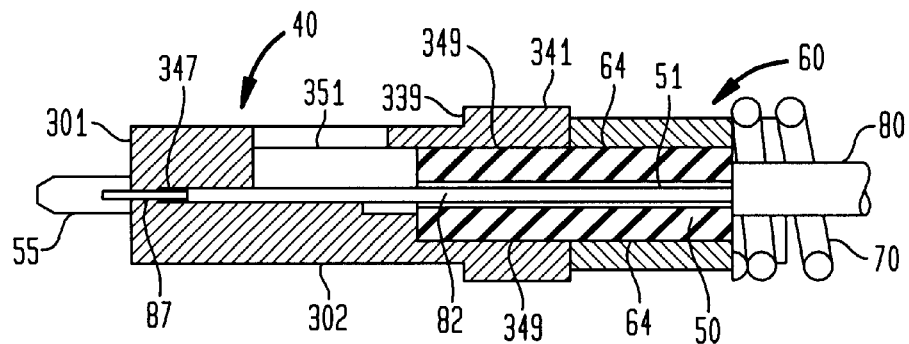
FIG. 15 is a side cross-sectional view of the ferrule of FIG. 14.
Figure 16:
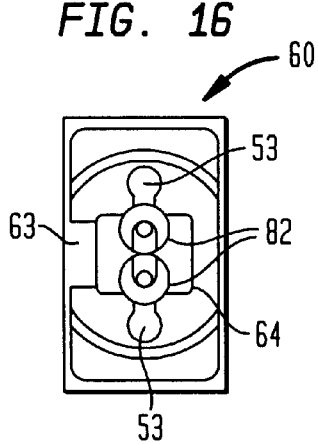
FIG. 16 is a rear view of the ferrule of FIG. 14.

The internal structure of connector 10 is discussed below. Ferrule 40 can be formed from a thermosetting polymer or from a thermoplastic liquid crystal polymer. Ferrule 40 has a rectangular body with a forward portion 302 and larger rectangular head 341 at its rear end (FIGS. 14 and 15). Head 341 defines a forwardly-facing shoulder 339 at the juncture of the head with the forward portion 302. The ferrule also has a pair of pin-receiving bores 343 extending front to rear. A pair of fiber-receiving bores 345 extend rearwardly from the front face 301 of the ferrule. Fiber-receiving bores 345 lie in a common horizontal plane with the pin-receiving bores 343. Each of bores 345 includes a narrow, fiber-constraining portion at the juncture of the bore and front face 301. These portions have interior diameters closely matched to the outer diameter of the unbuffered (bare) fiber. Each bore 345 also includes a larger-diameter portion 347 remote from the front face 301. Ferrule 40 further includes a central opening 349 extending forwardly into the ferrule from the rear end of the ferrule, in alignment with fiber bores 345. A top opening 351 communicates with central opening 349 at the juncture of the central opening 349 and the clearance portions 347 of the fiber bores.

Figure 12:
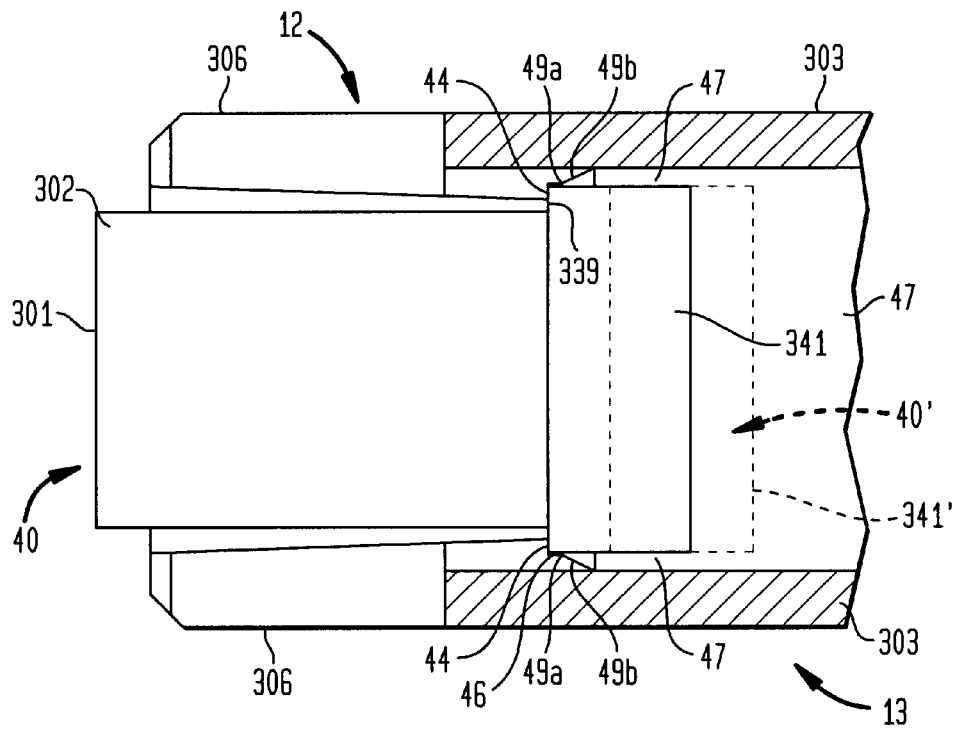
FIG. 12 is a top cross-sectional view of the housing and ferrule according to one embodiment of the present invention.
Figure 13:
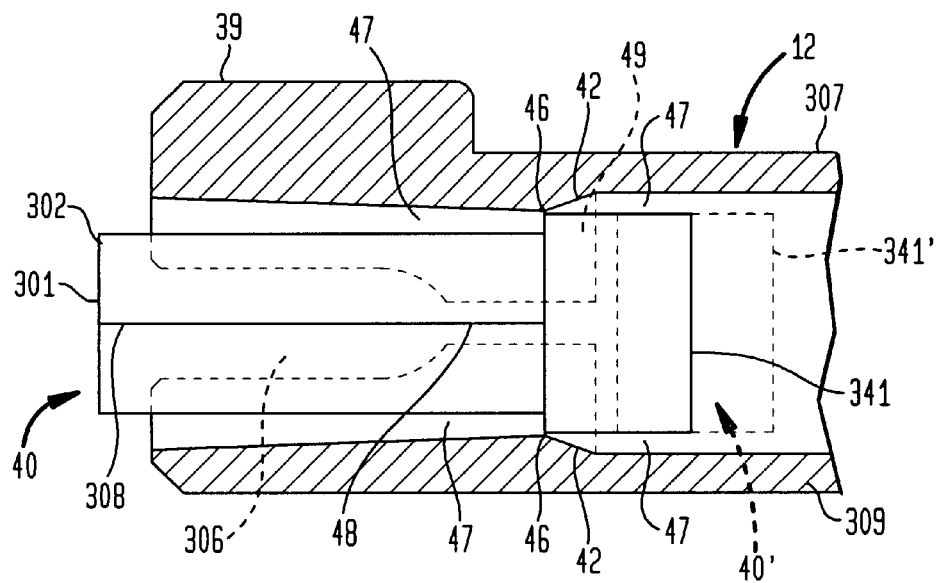
FIG. 13 is a side cross-sectional view of the housing and ferrule of FIG. 12.

Connector housing 12 has an internal passageway 47 (FIGS. 12 and 13) extending forwardly and rearwardly through the housing. The passageway is generally rectangular in cross-section, and is bounded by laterally opposite vertical walls 303 (FIG. 12), top wall 307 and bottom wall 309 (FIG. 13). A pair of openings 43, one of which is visible in FIG. 1 and FIG. 11, extend through vertical walls 303 of the housing in forward portion 13 and communicate with passageway 47. A pair of stops 44 (FIG. 12) project into passageway within the forward part 13 of the connector housing from vertical walls 303 on opposite sides of the passageway. Stops 44 define an opening between them larger than the width of the forward portion 302 of ferrule 40, but smaller than the width of head 341. Stops 44 define rearwardly-facing seating plane surfaces (facing to the right in FIG. 12) in a common plane. Lateral guide surfaces 49 extend rearwardly from each stop 44 along vertical walls 303. Each lateral guide surface includes a straight wall region 49*a* adjacent to the stop 44 and a sloping wall region 49*b* to the rear of the straight wall region 49*a*. Each sloping wall region 49*b* slopes laterally outwardly in the rearward direction. The connector housing also has vertical guide surfaces 42 (FIG. 13) on top wall 307 and bottom wall 309 adjacent stops 44. The vertical guide surfaces slope upwardly and downwardly, away from one another, in the rearward direction. The straight wall regions 49*a* of the lateral guide surfaces are spaced apart from one another by a distance just slightly larger than the width of head 341 on the ferrule. The forwardmost parts of the vertical guide surfaces are spaced apart from one another by a distance just slightly larger than the vertical dimension of head 341. Thus, when the ferrule is in the forward position depicted in solid lines in FIGS. 12 and 13, with the shoulder 339 of the ferrule abutting stops 44 and with the front face 301 of the ferrule projecting out of the front end of housing 12, the head of the ferrule is closely constrained by the guide surfaces so that the ferrule is centered with respect to the housing. However, when the ferrule is displaced to the rearward position partially indicated in broken lines at 341' in FIGS. 12 and 13, the head of the ferrule is remote from guide surfaces 42 and 49, as indicated at 341'. In this condition, the guide surfaces do not constrain the ferrule against lateral and vertical movement with respect to housing 12. In this condition, the ferrule can "float" or move laterally and vertically with respect to the housing and can tilt relative to the housing.

The housing further has a pair of slots 306 extending through the vertical walls 303. As best seen in FIG. 13, these slots extend rearwardly from the front of the housing to the guide surfaces 42 and 49, and hence extend rearwardly through stops 44. Slots 306 provide clearance around the horizontal mid-plane of the ferrule, and thus can accommodate defects such as "flash" or unintended projections formed on the ferrule forward part 302 at the parting line 308 resulting from a molding process used in manufacturing the ferrule.

The connector further includes a pin retainer 60, illustrated in FIGS. 14–19. The pin retainer has a central opening 64 of generally rectangular cross-section and of the same size as the central opening 349 in the ferrule. A partially conical recess 62 is provided in the rear surface of the pin retainer. An entry slot 63 extends into the central opening from the top of the pin retainer. A pair of pin-receiving bores 53 extend forwardly and rearwardly through the pin retainer on laterally opposite sides of central opening 64. Each pin-receiving bore 53 has a pair of pin engagement flats 52 adjacent the forward end of the pin retainer. Flats 52 have rearwardly-facing ramp surfaces 54 sloping outwardly at an oblique angle to the forward and rearward directions, and have forwardly facing stop surfaces 58 substantially perpendicular to the forward and rearward directions.

Each pin 55 (FIGS. 14 and 19) has a groove 56 adjacent a proximal end of the pin and has tapered surfaces 57 at its proximal and distal ends. Apart from the grooves and tapered surfaces, the pins are of uniform diameter. The pins desirably are formed from a metal such as steel.

Ferrule plug 50 is a generally tubular elastomeric element having a rectangular exterior cross-section closely matched to the dimensions of the central passage 349 in the ferrule and the central passage 64 in the pin retainer. The ferrule plug has an interior bore 51. The height of the interior bore, seen in FIG. 15, desirably is about 0.4 mm. The lateral width of the interior bore, seen in FIG. 14, desirably is about 1.15 mm at the rear end of the ferrule plug and gradually decreases to about 1 mm at the forward end of the ferrule plug.

Crimp nut 72 is a polymeric element incorporating a housing 364, having a pair of projections 360 extending forwardly from the housing. Projections 360 have snaps 362 extending laterally outwardly from the projections. A hollow boss 368 extends rearwardly from housing 364. Crimp ring 74 is a hollow metallic tube. Boot 76 is a tubular element formed from an elastomeric material. Spring 70 is a cylindrical metallic coil spring.

Figure 21E:
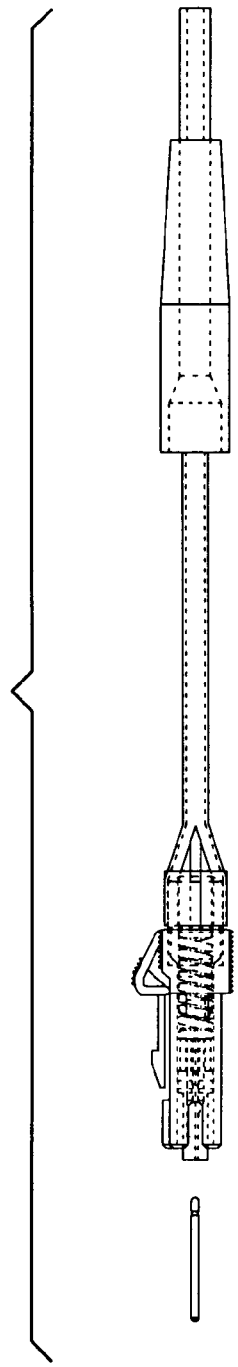

An assembly process is shown in sequence in FIGS. 21A–21F. As shown in FIG. 21A, the spring 70, crimp nut 72, crimp ring 74 and boot 76 are placed onto the cable. The outer jacket of cable 80 is split (FIG. 23B). The forward ends of buffered fibers 82 are pulled out of the outer jacket 80 and stripped as shown to provide portions 81 having 250 micron inner buffers exposed, and unbuffered forward ends 87. Ferrule 40 and ferrule plug 50 are assembled to the fiber ends. The forward end of the ferrule plug is received in the central passage 349 of the ferrule (FIGS. 14 and 15). The forward ends of fiber portions 81 are inserted into the interior bore 51 of the ferrule plug and guided by the ferrule plug so that the forward ends of these portions enter into the fiber bores 345, leaving unbuffered tips 87 projecting from the forward end of the ferrule. The fibers 81 and ferrule plug 50 are cemented in place by applying an adhesive such as an epoxy through the top opening 351 of the ferrule plug. The fiber ends 87 are polished flush with the front face 301 of the ferrule, leaving the assembly in the condition shown in FIG. 21B. At this stage, the ferrule plug 50 projects rearwardly from the ferrule 40.

Next, the pin retainer 60 is placed onto the buffered fibers 82 from the side. During this operation, the fibers pass through the entry slot 63 (see FIGS. 16 and 17) of the pin retainer 60, into the central opening 64 of the pin retainer, and the pin retainer is slid forwardly along the fibers until it abuts the rear face of the ferrule 40. In this condition, the rearwardly projecting portion of the ferrule plug 50 is engaged in the central opening 64 of the pin retainer. At this stage, the ferrule 40 and pin retainer 60 form a ferrule unit. The ferrule plug maintains vertical and lateral alignment of the ferrule 40 and pin retainer 60, so that pin-receiving bores 53 of the pin retainer are held in alignment with the pin receiving bores 343 of ferrule 40, as depicted in FIG. 14. The spring 70 is engaged with the ferrule unit, as shown in FIG. 21C, so that the forward end of spring 70 is engaged in the recess 62 in the rear surface of pin retainer 60, as also seen in FIG. 14. The housing 12 is then assembled to the crimp nut 72 (FIG. 21D). The projections 360 of the crimp nut enter into the interior passage 47 of connector housing 12, and snaps 362 on the crimp nut engage in holes 43 in the vertical walls of the connector housing. The forward part 302 of the ferrule passes through passage 47 of the connector housing, but the head 341 of the ferrule engages stops 44 within the connector housing in the manner shown in FIG. 12, so that the connector housing forces the ferrule unit, including ferrule 40 and pin retainer 60, rearwardly. This places spring 70 in compression between the rear surface of the pin retainer and the crimp nut, so that spring 70 biases the ferrule forwardly against the stops 44.

Figure 21F:
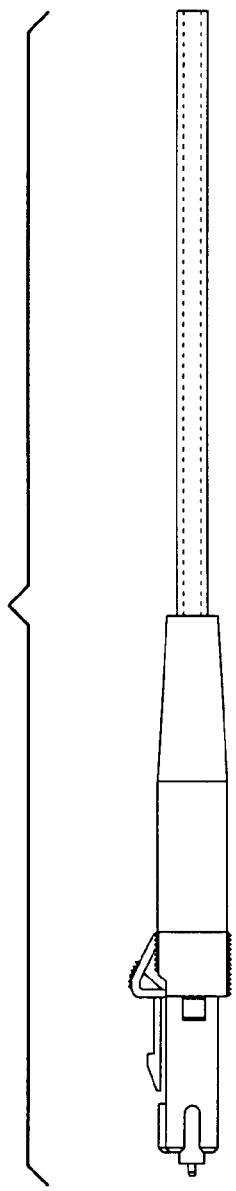

Next, the split cable jacket 80 is advanced over the boss 368 on the crimp nut, and crimp ring 74 is moved forwardly along the cable so that the crimp ring surrounds the boss and cable jacket. The crimp ring is crimped onto the jacket of the cable (FIG. 21E). The boot is advanced into place over the crimp ring (FIG. 21F). At this stage, a complete female connector has been provided on the end of the cable.

Figure 17:
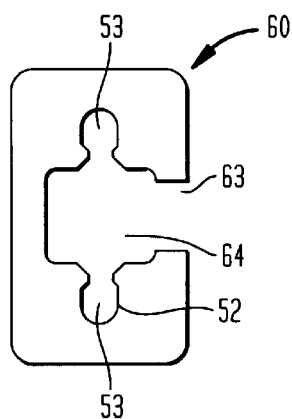
FIG. 17 is a front view of the pin retainer according to one embodiment of the present invention.
Figure 18:
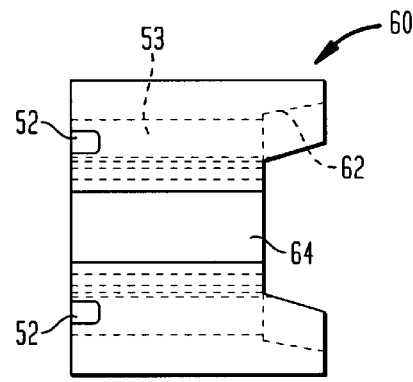
FIG. 18 is top view of the pin retainer of FIG. 17.
Figure 19:
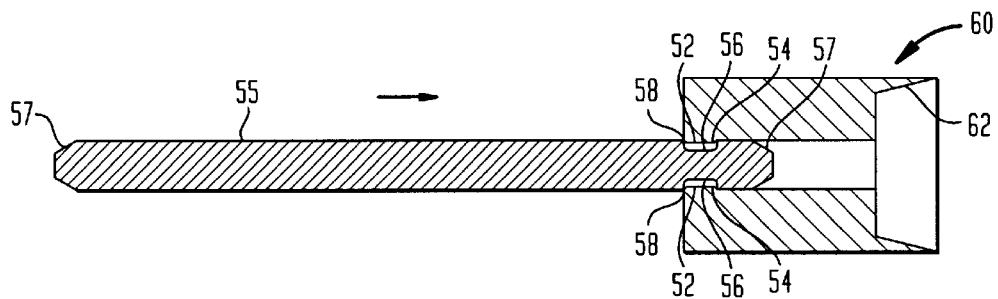
FIG. 19 a side cross-sectional view of the pin retainer of FIG. 17 showing a pin engaged pin engaged in the pin retainer.

The pins 55 can be assembled later, either in the field or at the factory. To form a male end, two pins are added. To make a hermaphroditic end, one pin is added. The alignment pins 55 are inserted through the front of the ferrule 40 after the final assembly of the connector, while the ferrule and pin retainer are in place in the housing 12. This adds convenience to the assembly process of the connector, and provides the flexibility of adding pins 55 based on demand and/or changing field requirements. The pin engagement flats 52 of the pin retainer 60 engage with the groove 56 of the pins (FIGS. 17–19). The pins pass freely through the pin-receiving bores 343 of the ferrule, until the proximal ends of the pins engage flats 52. The forwardly facing stop surfaces 58 on the pin retainer (FIG. 19) provide a stop to limit rearward travel of the pins during insertion. The sloping ramp surfaces 54 will allow purposeful extraction of the pins 55 from the connector if necessary without destruction. Thus, female connectors can be converted to male connectors by inserting pins 55, whereas male connectors can be converted to female by removing pins, all while leaving the connectors otherwise intact. However, the pins of the male connectors stay engaged in the retainer through normal connector usage.

Figure 20:
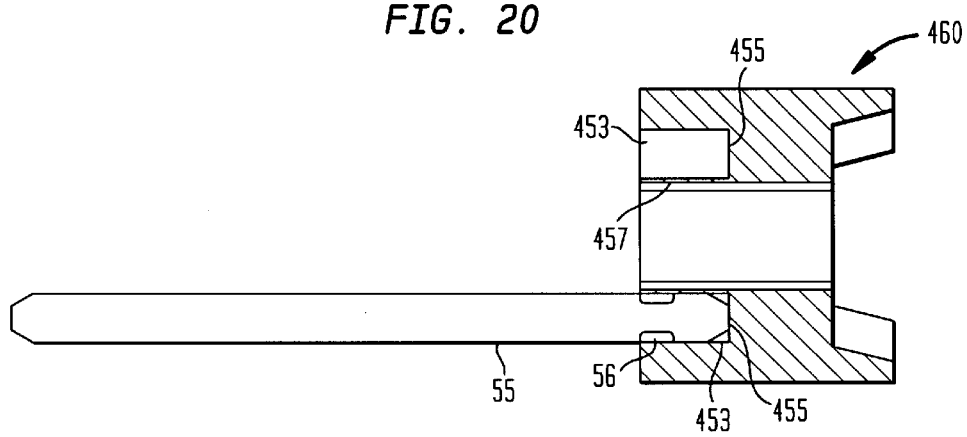
FIG. 20 is a top cross-sectional view of a pin retainer according to another embodiment of the present invention showing a pin engaged therein.

In a further embodiment (FIG. 20), a pin retainer 460 is formed from a polymeric material such as a polycarbonate having some flexibility. The pin-receiving bores 453 are formed as cylindrical blind holes extending into the pin retainer from its forward face to closed ends 455. The interior diameters of the pin-receiving bores 453 are slightly smaller than the diameters of pins 55, so that the proximal end of each pin can be press fit into the pin-receiving bores. The closed ends 455 of the pin-receiving bores control the rearward position of the inserted pins. The pins 55 are retained by a combination of the press fit and the flexible material returning to its original shape and bulging into the grooves 56 on the pins. The other features of the pin retainer are identical to those discussed above. Here again, the pins can be assembled after the remaining components of the connector have been assembled, and can be removed by pulling them forwardly without destroying the connector. Pin retainers according to this embodiment are easier to mold than the pin retainers discussed above, and provide a more positive stop during assembly of the pins to the connector.

Ferrule plug 50 will accommodate both ribbon type and 900 micron buffer cable. The ferrule plug 50 serves to stiffen the otherwise exposed 250 micron buffered fibers 81 so as to prevent bending of these fibers and light loss. If the connector 10 is used with 900 micron buffered cable, the 900 micron buffers 82 of the cable abut the rear end of ferrule plug 50 or are placed in close proximity to the rear of the ferrule plug. As discussed below, the ferrule must move rearwardly relative to the housing 12 during operation. When the ferrule 40 moves back, the 900 micron buffers 82 are also forced to the rear; the stripped (250 micron) portions 81 do not bend. When the connector is used with two-fiber ribbon cable, the ribbon cable can extend into the interior passageway 51 of the ferrule plug.

The connectors as discussed above can be used in the same way as other standard MT-RJ connectors. For example, male and female connectors can be engaged with one another by inserting the forward parts of the connector housings into the bores 23 and 24 of a double-ended coupler 20 as discussed with reference to FIGS. 1–10. Prior to insertion into the coupler, the front face 301 of the ferrule on each connector protrudes from the front of the connector housing. When the connectors are inserted into the coupler, the pins of the male connector enter the pin-receiving bores in the ferrule of the female connector, and the front faces of the two ferrules engage one another. As the connectors are engaged in the coupler and move toward one another, each ferrule must move rearwardly within its connector housing against the bias of the spring within the connector. Once both connectors have been fully seated in the coupler, the ferrules and the ends of the fibers are held in close abutting contact with one another by the springs in the connectors. The fibers carried in the two ferrules are precisely aligned with one another by the engagement between the pins and the pin-receiving bores. This precise alignment is provided even if imperfections in the coupler or the connector housings introduce some misalignment between the two connector housings. The ability of the ferrules to move laterally and vertically relative to the connector housings, and to tilt relative to the connector housings, allows the pins to bring the ferrules into alignment provided that the initial misalignment introduced by the other components is within the design tolerance range. The connectors also can be employed with a single-sided socket having pins arranged in the same manner as a male connector, as illustrated in FIG. 11. In this case, all of the misalignment is taken up by the floating action of the ferrule in the female connector.

Numerous variations and combinations of the features discussed above can be utilized without departing from the present invention. Merely by way of example, the features described above can be applied to fiber optic connectors other than MT-RJ connectors. In a further variant, the arrangement of the stops on the interior of the connector housing can be changed so that the flat surfaces which arrest the head of the ferrule are disposed along the top and bottom walls of the passageway, rather than along lateral walls of the passageway.

A coupler can be made with a door as discussed above with reference to FIGS. 6–10 on both ends. Also, the panel stops can be provided on both sockets of a double-ended coupler. Doors and other features discussed above with reference to a socket in a double-ended coupler can be provided a single-ended socket, and vice-versa. In a further variation, the indentation on the outside of the socket used to accommodate the upper door hinge may be small indentations at the rear end of the socket; they need not be elongated ledges as illustrated. This variant is less preferred, because it sacrifices the advantages of the elongated ledges in identifying the orientation of the socket. Likewise, the recessed bottom surface which serves to provide clearance for the lower door hinge could be provided only near the rear end of the socket. In a further variant, the door can be arranged to open upwardly or downwardly; the hinges and spring can be received in indentations on laterally-opposite sides of the socket, so that the pivot axis of the door is horizontal rather than vertical. The hinges need not include pins received in recesses in the housing. For example, the door or the housing can be provided with small flexible regions, commonly referred to as "living hinges". Also, the spring need not be a separate element, but can be incorporated into one of the molded parts. In a less-preferred variant, the spring is entirely omitted and the door must be closed manually.

While many of the claims recite complete combinations, it should also be understood that further aspects of the present invention include subcombinations and individual elements included in the foregoing structures and/or in the combinations recited by the claims.

As these and other variations and combinations can be used, the foregoing description of the preferred embodiments should be taken by way of illustration rather than by way of limitation of the claimed invention.

What is claimed is:

1. A socket for receiving a fiber optic connector housing, said socket having forward and rearward directions, upward and downward directions transverse to the forward and rearward directions and lateral directions transverse to the other said directions, said socket defining a bore extending in said forward and rearward directions, said bore having a main portion and a keyway extending along the top of the main portion, said keyway having lateral dimensions less than the lateral dimensions of the main portion, said socket having an exterior profile including a principal portion having a first width and a top portion having a second width less than said first width, said top portion and said principal portion cooperatively defining a pair of ledges extending axially on opposite sides of said top portion, said main portion of said bore being disposed in said principal portion of said exterior shape, said keyway extending in said top portion wherein said bore is adapted to receive an MT-RJ connector hosing.

2. A socket as claimed in claim 1, wherein said socket has an opening at the rearward end of the socket for insertion of a fiber optic connector housing into said bore and wherein said socket has a panel engaging portion at the forward end of the socket and a pair of mounting lugs projecting upwardly and downwardly from the panel engaging portion.

3. A socket as claimed in claim 1, wherein said first width is approximately 9.3 mm and said exterior profile including said principal portion and said top portion has a height of 10 mm.

4. A socket as claimed in claim 1 has a top wall overlying said keyway and a latch pocket extending downwardly through the top wall.

5. A socket as claimed in claim 4, wherein said latch pocket has a forwardly-facing catch surface intersecting the keyway portion of the bore and wherein said top wall defines a top interior surface including a ramp surface sloping downwardly in the forward direction and extending from the rear end of the socket to the vicinity of the latch pocket and catch surface.

* * * * *